3,082,120
HEAT RESISTANT ARTICLE COMPRISING
PHOSPHORUS OXYNITRIDE
Peter Richard Bloomfield, 44–46 Kingsway,
London W.C. 2, England
No Drawing. Filed Aug. 23, 1960, Ser. No. 51,460
Claims priority, application Great Britain Aug. 31, 1959
8 Claims. (Cl. 117—126)

The invention relates to heat resistant materials and particularly to processes for the preparation of heat desistant materials based on or containing the inorganic material phosphorus oxynitride.

Phosphorus oxynitride is an inorganic material described in the literature as a white powder which fuses at red heat to give a black glossy material. It is insoluble in water and not attacked by aqueous acids or alkalis.

It is an object of the invention to provide a novel process for the preparation of heat resistant materials.

According to the present invention there is provided a process for the preparation of heat resistant materials based on or containing the inorganic material phosphorus oxynitride, which process comprises reacting polymeric phosphonitrilic chloride with one or more equivalents of a metal oxide which has an anhydrous oxide in a stable valency state which is thermally stable up to at least 350° C. and which oxide also has a chloride in the same valency state which is stable and non-volatile up to at least 300° C.

The reaction of polymeric phosphonitrilic chloride and metal oxides may be illustrated by the following equation

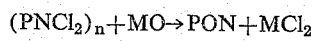

$$(PNCl_2)_n + MO \rightarrow PON + MCl_2$$

where $n$ is 3 or higher and MO is a metal oxide, the metal in this example being divalent. Phosphonitrilic chloride is a polymeric material and may be obtained in the form of the trimer or tetramer which are crystalline and cyclic. Polymeric phosphonitrilic chloride may alternately be linear or branched and have a degree of polymerisations varying from 8 or 9 up to something of the order of 1,000.

The metal oxide may be one of the following oxides: sodium oxide, magnesium oxide, zinc oxide, calcium oxide, cuprous oxide, cupric oxide, bismuth oxide, ferric oxide or lead monoxide (litharge).

The invention also includes a moulding process employing the above-mentioned process for the preparation of heat resistant materials wherein the phosphonitrilic chloride is mixed with one or more equivalents of the metal oxide and the mixture subsequently moulded in a mould at a temperature above 150° C.

A further manner in which the process for the preparation of heat resistant materials according to the invention may be employed is a process for making articles which comprises the steps of impregnating glass or asbestos cloth with a mixture of the phosphonitrilic chloride and at least one equivalent of metal oxide, and heating the impregnated cloth under pressure in a press at a temperature above 150° C. whereby the phosphonitrilic chloride and the metal oxide are reacted to form a phosphorus oxynitride.

In the moulding process or the process for making laminates it is preferred that the metal oxide is cuprous oxide, or bismuth oxide in which case bismuth oxide is present in the reaction mixture in an amount of at least three equivalents in order that the resulting halide is bismuth oxychloride.

The moulding process according to this invention employs moulding compositions prepared by mixing the polymeric phosphonitrilic chloride and the metal oxide. The moulding composition is then moulded by heating in a mould at temperatures above 150° C.; in general the moulding temperatures may be up to at least 400° C. or higher although the preferred range is from 150 to 300° C.

However in specific cases there will be optimum temperatures which will give best results, for example the reaction with cuprous oxide is preferably carried out at a temperature between 150° and 250° C. for a period of 15 minutes to 2 hours and the resulting product post-cured at a temperature of from 250° C. to 350° C. for a period of from 30 minutes to 1 hour. In the case of bismuth oxide the reaction is preferably carried out at a temperature of 150° C. to 220° C. for a period of 15 to 30 minutes.

Moulding processes carried out employing equimolar quantities of polymeric phosphonitrilic chloride and the metal oxide are usually violently exothermic but they can be controlled by using a sufficiently high moulding pressure e.g. a pressure of about one-half or one ton per square inch. The violence of the reaction can also be modified by using an excess of the metal oxide or by incorporating into the moulding composition an inert filler. Excess metal oxide may remain as a filler or it may react with the metal chloride or may react into the resulting polymeric structure.

For use in moulding processes or processes for making laminates from glass cloth it is preferred that the oxide employed is one which results in an insoluble metal chloride being formed. The preferred oxides are cuprous oxide and bismuth oxide (which is present in an equimolar excess in order that bismuth oxychloride is formed); lead monoxide is also suitable.

The moulding compositions may also be used to prepare laminates employing glass cloth or asbestos cloth or cloth from equivalent heat resistant fibrous materials.

In the moulding process or the process for making laminates the fillers which are preferably employed are powdered fillers such as powdered glass or other finely divided heat resistant organic material.

The invention also includes heat resistant materials when produced by a process according to the invention. The resulting products made from the processes of the invention have been found to be stable at very high temperatures and have been found to be resistant to organic solvents, water, acids and alkalis provided that the heat resistant material is properly cured e.g. by a sufficient heat treatment and the metal halide which is formed during the reaction is insoluble. It is understood, of course, that the process can be carried out with single layers of cloth.

Following is a description by way of example of processes in accordance with the present invention.

*Example I*

20 g. oily phosphonitrilic chloride, 38.5 g. of lead oxide (litharge) and 20 g. glass powder as filler were mixed in an end runner mill. The thoroughly mixed ingredients were heated in a mould at a temperature of 150° C. and under a pressure of 1 ton per sq. inch for 1 hour. The mould was then removed from the press and heated in an oven at 300° C. for 1 hour. A strong moulding was obtained which showed no loss in strength after heating to 550° C.

*Example II*

20 g. of oily phosphonitrilic chloride and 24.6 g. of cuprous oxide were thoroughly mixed. The paste obtained was used to impregnate 12 layers of heat cleaned satin weave glass cloth. These were then laminated in a press at 150° C. under a pressure of 200 p.s.i. The laminate obtained was post-cured at 300° C. for 1 hour. The flexural strength of specimens cut from this laminate was 23,000 p.s.i.

*Example III*

20 g. oily phosphonitrilic chloride, 25 g. cuprous oxide and 20 g. asbestos flock were mixed thoroughly to give a moulding composition. This was then moulded in a positive mould at ½ ton per sq. inch at 200° C. for 15 minutes. The moulding was removed from the mould and post-cured at 300° C. for ½ hour. A hard strong moulding was obtained. After heating to 500° C. the moulding had a punch shear strength of 10,000 p.s.i.

*Example IV*

10 g. oily phosphonitrilic chloride and 40 g. of bismuth oxide were mixed in an end runner mill and the mixture moulded at 200° C. at 2 ton per sq. inch for ½ hour. The moulding obtained had a punch shear strength of 8,000 p.s.i.

*Example V*

10 g. of a crude mixture of phosphonitrilic chlorides (trimer, tetramer and higher polymers having a degree of polymerisation of from 10 to 200) was mixed with 25 g. of cuprous oxide and the mixture moulded at 200° C. at 1½ ton per sq. inch for ½ hour. A strong hard moulding was obtained.

*Example VI*

10 g. of rubbery phosphonitrilic chloride were mixed with 40 g. of litharge on a roller mill and the mixture moulded at 200° C. for 1 ton per sq. inch for ¾ hour. A strong hard moulding was obtained.

*Example VII*

10 g. of oily phosphonitrilic chloride and 25 g. cuprous oxide were mixed with 20 g. of 10 mesh mica flake. This material was then moulded at 200° C. at 1 ton per sq. inch for ½ hour. The mould was then placed in an oven at 300° C. for one hour. The moulding obtained had a punch shear strength of 14,000 p.s.i.

*Example VIII*

A heat resistant material was prepared by mixing 40 g. of magnesium oxide and 116 g. of oily phosphonitrilic chloride. The mixture was heated on an oil bath at a temperature between 160 and 180° C. An exothermic reaction took place to provide a brittle foamed resinous product which contained magnesium chloride. The product of the reaction can be used as a high temperature insulating material, the product preferably being formed in situ where required in such an application.

*Example IX*

In a moulding process 81 g. of zinc oxide and 116 g. of crystalline trimer of phosphonitrilic chloride were mixed and moulded at 200° C. for 1 hour at 1 ton per sq. inch pressure. The moulded article was removed from the mould and post-cured at 300° C. for 1 hour to provide a hard compact moulding. Zinc chloride formed during the reaction can be extracted with ether or water to provide a product which is relatively stable to these materials.

A similar preparation of a heat resistant material was carried out employing calcium oxide in place of zinc oxide. The resulting product was very similar to that described above.

I claim:
1. A process for the preparation of phosphorous oxynitride which comprises heating to a temperature within the range of about 150° C. to about 400° C. an admixture of polymeric phosphonitrilic chloride with at least one equivalent of a metal oxide which has an anhydrous oxide in a stable valency state which is thermally stable up to at least 350° C. and which oxide also has a chloride in the same valency state which is stable and nonvolatile up to at least 300° C., whereby a reaction occurs to form the phosphorous oxynitride.

2. A process as claimed in claim 1 wherein the oxide is selected from the group consisting of sodium oxide, magnesium oxide, zinc oxide, calcium oxide, cuprous oxide, cupric oxide, bismuth oxide, ferric oxide and lead monoxide.

3. A process as claimed in claim 1 wherein the heating is carried out in a mould under a pressure of at least ½ a ton per square inch to produce a moulded product.

4. A process as claimed in claim 3 wherein the metal oxide is cuprous oxide.

5. A process as claimed in claim 3 wherein the metal oxide is bismuth oxide and is present in the reaction mixture in an amount of at least three equivalents in order that the resulting halide is bismuth oxychloride.

6. A process for making heat resistant articles which comprises the steps of impregnating a cloth of mineral fibers with a mixture of phosphonitrilic chloride and at least one equivalent of a metal oxide which has an anhydrous oxide in a stable valency state which is thermally stable up to at least 350° C. and which oxide also has a chloride in the same valency state which is stable and nonvolatile up to at least 300° C., and heating the impregnated cloth under pressure in a press at a temperature above 150° C., whereby the phosphonitrilic chloride and metal oxide are reacted to form a phosphorus oxynitride.

7. A process as claimed in claim 6 wherein the metal oxide is cuprous oxide.

8. A process as claimed in claim 6 wherein the metal oxide is bismuth oxide and is present in the reaction mixture in an amount of at least three equivalents in order that the resulting halide is bismuth oxychloride.

No references cited.